(12) United States Patent
Goto et al.

(10) Patent No.: US 8,248,971 B2
(45) Date of Patent: Aug. 21, 2012

(54) VEHICLE NETWORK SYSTEM

(75) Inventors: Hideki Goto, Tokyo-to (JP); Manabu Kagami, Nagoya (JP); Seigo Takai, Aichi-ken (JP); Hayato Yuuki, Mie (JP); Shigeo Hayashi, Mie (JP)

(73) Assignees: Autonetworks Technologies, Ltd., Mie (JP); Toyota Jidosha Kabushiki Kaisha, Toyota (JP); Sumitomo Wiring Systems, Ltd., Mie (JP); Sumitomo Electric Industries, Co., Osaka (JP)

( * ) Notice: Subject to any disclaimer, the term of this patent is extended or adjusted under 35 U.S.C. 154(b) by 193 days.

(21) Appl. No.: 12/073,118

(22) Filed: Feb. 29, 2008

(65) Prior Publication Data

US 2008/0259946 A1    Oct. 23, 2008

(30) Foreign Application Priority Data

Mar. 2, 2007    (JP) .............................. P.2007-052711

(51) Int. Cl.
*H04B 7/005* (2006.01)
*H04B 3/36* (2006.01)
*H04W 4/00* (2009.01)
*H04L 12/413* (2006.01)

(52) U.S. Cl. ........ 370/278; 370/293; 370/327; 370/466; 398/62; 398/64; 398/176

(58) Field of Classification Search .................. None
See application file for complete search history.

(56) References Cited

U.S. PATENT DOCUMENTS

| | | | |
|---|---|---|---|
| 2001/0048688 A1 | 12/2001 | Fuhrmann et al. | |
| 2002/0126951 A1* | 9/2002 | Sutherland et al. | 385/24 |
| 2003/0215235 A1* | 11/2003 | Norizuki et al. | 398/59 |
| 2005/0002620 A1* | 1/2005 | Tanaka | 385/92 |

FOREIGN PATENT DOCUMENTS

| | | |
|---|---|---|
| JP | A-2000-269978 | 9/2000 |
| JP | A 2001-352336 | 12/2001 |
| JP | A-2004-318682 | 11/2004 |

OTHER PUBLICATIONS

Japanese Office Action issued in Japanese Patent Application No. 2007-052711 on Jun. 23, 2009.

* cited by examiner

*Primary Examiner* — Nishant B Divecha
(74) *Attorney, Agent, or Firm* — Oliff & Berridge, PLC

(57) ABSTRACT

A vehicle network system is provided with a plurality of star networks, a plurality of devices mounted on a vehicle are connected in a star shape through respective branch lines in each of the star networks, and a trunk line for connecting the plurality of star networks, the branch lines are communication lines for optical communications, and the trunk line is a communication line for electric communication.

4 Claims, 4 Drawing Sheets

VEHICLE NETWORK SYSTEM

The present invention claims priority from Japanese Patent Application No. 2007-052711 filed on Mar. 2, 2007, the entire content of which is incorporated herein by reference.

BACKGROUND OF INVENTION

1. Field of the Invention

The present invention relates to a vehicle network system for communications between a plurality of devices mounted on a vehicle.

2. Description of the Related Art

In recent years, a number of electronic devices are mounted for various operations on a vehicle. This makes it necessary to mount a plurality of ECUs (Electronic Control Units) on the vehicle for controlling the actions of those electronic devices. For the cooperative actions of the plural ECUs, the plural ECUs have to share information, and the vehicle is desired that they are connected with each other through a network. FIG. 4 shows a schematic diagram of a vehicle network system in the related art. In FIG. 4, reference numeral 100 designates ECUs mounted on a (not-shown) vehicle, and four ECUs 100 are connected through communication lines 101. In FIG. 4A, the constitution is made of a cascade type of a network system, in which the four ECUs 100 are connected in series. The data can be transmitted from a source ECU 100 to a target ECU 100 through another ECU 100. On the other hand, FIG. 4B shows the constitution of a star network system, in which the communication line 101 is branched at a branching point 102 into four branch lines individually connected with the ECUs 100. In the star network system, the data transmitted from a single ECU 100 can be received by all the remaining ECUs 100.

In JP-A-2001-352336, a network is constituted to a plurality of network nodes which is connected with a star node. The star node is provided with a plurality of interfaces for connecting the network nodes individually. The star nodes release the interface in response to a pilot signal from each network node thereby to transmit a message to at least one network node. This network is provided at the star node with a decision circuit for deciding one interface to be opened for transmitting the message, in case two or more pilot signals arrive simultaneously at the interface of the star node, so that it may solve the conflict of accesses.

In the case of the cascade type of the network system shown in FIG. 4A, however, the ECUs 100 other than the ECUs 100 at the two ends have to receive the data transmitted from the ECU 100 of one side and to transmit the data to the ECU 100 of the other side. As a result, the transmitting circuits and the receiving circuits have to be mounted individually by two, thus causing a problem of a high cost. In the case of the star network system, as shown in FIG. 4B, each ECU 100 may have one transmitting circuit and one receiving circuit. However, metal cables are frequently used as communication lines 101. In case the metal cables are branched, as shown, at a branching point 102, reflection waves are caused by the impedances of the metal cables when signals for the data transmissions are propagated through the communication lines 101. Depending upon the degrees of those reflection waves, there arises a problem that the communication troubles such as the so-called ringing phenomenon may occur.

In recent years, it has been noted that the optical fibers are used as the communication lines constituting the network. In case the communications are performed through the optical fibers, it is advantageous that the ringing phenomenon is not caused by the aforementioned influences of the reflected waves so that the communications can be performed easily and reliably. In the case of the network system mounted on the vehicle, however, the communication lines have to be arranged in the limited space of the vehicle. This may make it necessary to bend and arrange the communication lines. The optical fibers have a problem that they are hard to bend and arrange, i.e., that the optical fibers have a low flexibility for arrangement. In addition, the branching of a light causes a drop of an optical power. As the number of devices to be connected with one optical fiber increases the more, it may be impossible to retain the sufficient S/N ratios in the individual devices.

SUMMARY OF INVENTION

In one or more embodiments of the invention, a vehicle network system is constituted to form a star network by using communication lines for optical communications as branch lines thereby to connect a plurality of devices. A plurality of star networks is connected by using the communication lines for electric communications. The communication lines can be easily arranged in the vehicle and no ringing phenomenon can occur in the communications.

Moreover, in one or more embodiments of the invention, a vehicle network system is constituted to form a star network by using converters for mutual connections of optical signals and electric signals thereby to connect a plurality of devices individually with the converters through branch lines. The plural converters are connected through a trunk line thereby to connect the plural star networks. The trunk line between the converters can be easily arranged in the vehicle and the ringing phenomenon can be reliably prevented from occurring in the star network.

In addition, in one or more embodiments of the invention, a vehicle network system is constituted such that a converter outputs signals inputted from one trunk line or branch line to all the remaining trunk lines or branch lines. Information can be reliably share between a plurality of devices mounted on the vehicle.

According to a first aspect of the invention, a vehicle network system is provided with a plurality of star networks, a plurality of devices mounted on a vehicle are connected in a star shape through respective branch lines in each of the star networks, and a trunk line for connecting the plurality of star networks, the branch lines are communication lines for optical communications, and the trunk line is a communication line for electric communication.

In the aspect of the invention, the star network is constituted by connecting the plural devices in the star shape by the branch lines, and the vehicle network system is constituted by connecting the plural star networks by the trunk line. At this time, the branch lines may be communication lines of optical fibers for optical communications, and the trunk line may be a communication line of a metal cable for electric communications. The network system is constituted such that its portions of the shorter distance between the devices are made of the star network for the optical communications whereas its portions of the longer distance are made for the electric communications. With this constitution, the portions, in which the communication lines are highly possibly bent when arranged in the vehicle, may be made of the communication lines such as the metal cables strong against the bending operations. Moreover, the star network, in which the ringing phenomenon may occur, may be made of the communication lines such as the optical fibers which no reflection wave occurs to prevent the ringing phenomenon. By distributing the plural devices to be mounted on the vehicle suitably into a plurality of blocks, moreover, the drop in the optical power can also be more suppressed than the case, in which all the devices are connected with a single network of optical fibers.

According a second aspect of the invention, the vehicle network system includes converters provided to the respective star networks for performing mutual conversions between optical signals and electric signals, the plurality of devices are connected to the converters through the branch lines in the respective star networks, and wherein the converters are connected to each other through the trunk line.

In the aspect of the invention, the star network is constituted by using the converter for connecting the optical signals and the electric signals and by connecting the plural devices individually with the converter through the branch lines. Further, the vehicle network system is constituted by connecting the plural converters through the trunk line thereby to connect the plural star networks with each other. The optical signals, as outputted from one device, are converted into the electric signals by the converter and are transmitted to the converter of another star network. The received electric signals are converted into optical signals, and these optical signals are fed to another device. In case the communications are performed in one star network, on the other hand, the converter does not convert the optical signals outputted from one device, but may feed the optical signals to another device. As a result, the network system having the optical communications and the electric communications mixed therein can be constituted simply and reliably by constituting the star network around the converter and by connecting the converters with each other through the trunk line.

According a third aspect of the invention, The vehicle network system includes the converters output the signals inputted from the trunk line to the branch lines, and the converters output the signals inputted from one of branch lines to the trunk line and all another branch lines.

In the aspect of the invention, the converters output the signals inputted from one converter connected with one trunk line or one device connected with one branch line, to all the remaining trunk lines or branch lines. As a result, the signals can be fed from one device to all the devices connected with the converters through the trunk lines or branch lines. Therefore, all the devices in this vehicle network system can share the information easily and reliably.

According to the first aspect of the invention, the star network is constituted by using the communication lines for the optical communications as the branch lines thereby to connect the plural devices. The vehicle network system is constituted by using the communication lines for the electric communications as the trunk line thereby to connect the plural star networks. As a result, the vehicle network system can be easily arranged in the vehicle so that the degree of freedom for designing the vehicle network system can be enhanced. Moreover, the arrangement of the communication lines such as the optical fibers by bending them can be avoided as much as possible. Thus, the breakage of the communication lines is hard to occur thereby to enhance the reliability of the vehicular network. Still moreover, the plural devices are properly distributed among the plural networks so that the drop of the optical power for the optical communications can be suppressed. Therefore, the communications can be ensured without the ringing phenomenon in the star network, thereby to enhance the reliability of the communications.

According to the second aspect of the invention, moreover, a vehicle network system, in which the optical communications and the electric communications are mixed, can be constituted simply and reliably. The star network is formed by using the converter for connecting the optical signals and the electric signals and by connecting the plural devices individually with the converter through the branch lines. The plural star networks are connected by connecting the plural converters through the trunk line. Therefore, it is easily possible to arrange the vehicle network system in the vehicle and to prevent the occurrence of the ringing phenomenon.

According to the third aspect of the invention, moreover, the converters output the signals inputted from one trunk line or branch line, to all the remaining trunk lines or branch lines. The signals can be fed from one device to all the devices connected with the converters through the trunk lines or branch lines. Therefore, all the devices in this vehicle network system can share the information easily and reliably. Thus, the plural devices mounted on the vehicle can cooperate easily with each other.

Other aspects and advantages of the invention will be apparent from the following description and the appended claims.

DESCRIPTION OF EXEMPLARY EMBODIMENTS

Figure 1:
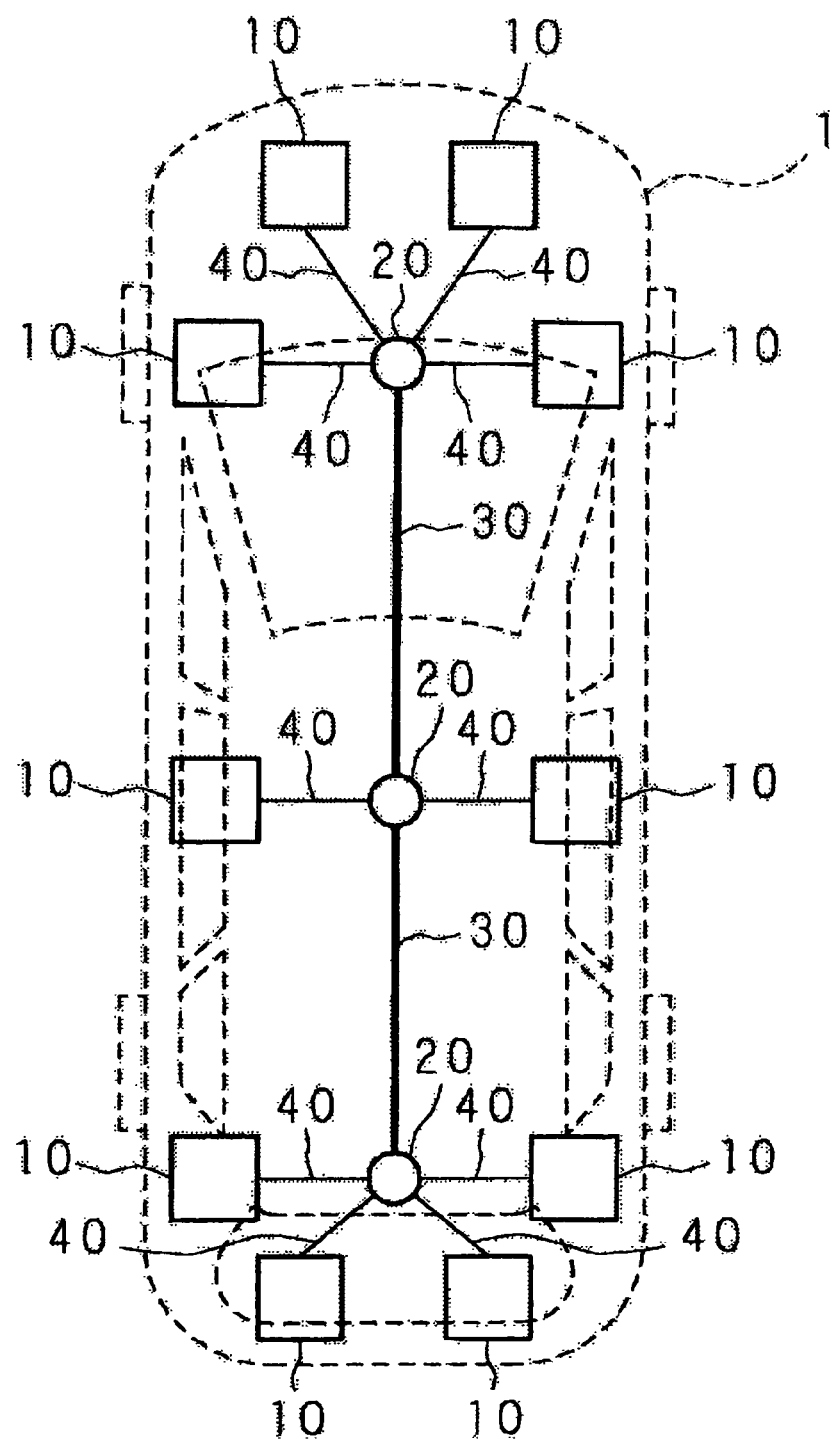
FIG. 1 is a schematic diagram showing a vehicle network system according to an embodiment.

Embodiments of the invention are described in the following with the accompanying drawings. FIG. 1 is a schematic diagram showing the vehicle network system. A vehicle 1 is shown by broken lines in FIG. 1, and has a plurality of ECUs 10 mounted thereon. The ECUs 10 control the actions of various electronic devices (although omitted from the drawing) mounted on the vehicle 1, such as electronic devices for turning ON/OFF head lights, tail lights, brake lights or room lights mounted on the vehicle 1, electronic devices for activating wipers, electronic devices for driving horns, electronic devices for changing the speed automatically, electronic devices such as an ABS (Anti-Lock Brake System) or TCS (Traction Control System) for the electric running control of the vehicle 1, and electronic devices for activating air bags.

On the vehicle 1, moreover, there are mounted a plurality of converters 20 which have functions to convert optical signals inputted into electric signals, to output the electric signals, and to convert electric signals inputted into optical signals, to output the optical signals. The plural ECUs 10 mounted on the vehicle 1 are individually connected with one converter 20 through optical fibers 40. The plural ECUs 10 can constitute a star network centering the converter 20 thereby to transfer information mutually by optical communications. Moreover, the plural converters 20 are serially connected inbetween through a metal cable 30 so that they can transfer information mutually by electric communications.

The converter 20 is provided with a plurality of connecting ports for connecting the optical fibers 40 and one or a plurality of connecting ports for connecting the metal cable 30. The converter 20 can convert optical signals inputted through the optical fibers 40 from the ECUs 10, into electric signals, to output the electric signals another converter 20 through the metal cable 30. The converter 20 can convert electric signals inputted from another converter 20 through the metal cable 30 into optical signals, to output the optical signals to the ECUs 10 through the optical fibers 40. Moreover, the optical signals inputted from the ECUs 10 through the optical fibers 40 can be outputted, without being converted into electric signals, as the optical signals to another ECU 10. The electric signals inputted from one converter 20 through the metal cable 30 can be transmitted, without being converted into optical signals, as the electric signals to another converter 20.

In the shown example, the converters 20 are arranged individually at three portions of the front, central and rear portions of the vehicle 1. The four ECUs 10 are connected in a star shape with the front converter 20 through the optical fibers 40. The two ECUs 10 are connected in a star shape with the central converter 20 through the optical fibers 40. Further, the four ECUs 10 are connected in a star shape with the rear converter 20 through the optical fibers 40. Moreover, the front converter 20 is connected with the central converter 20 through the metal cable 30, and the central converter 20 is connected with the rear converter 20 through the metal cable 30. In the vehicle 1, the front portion and the central portion, and the central portion and the rear portion are spaced by relatively long distances, and the signal lines have to be arranged along the body of the vehicle 1. These components are wired by using the easily bendable metal cables 30, so that the vehicle network system can be easily constituted. Moreover, the plural ECUs 10 are arranged relatively concentratedly in the front portion of the vehicle 1 and at relatively short distances, so that they can be straightly wired. Therefore, the plural ECUs 10 and the converters 20 are connected in the star shape by the optical fibers 40 so that the network can be easily constituted while preventing the ringing phenomenon. Like discussions apply to the central portion and the rear portion of the vehicle 1.

Figure 2:
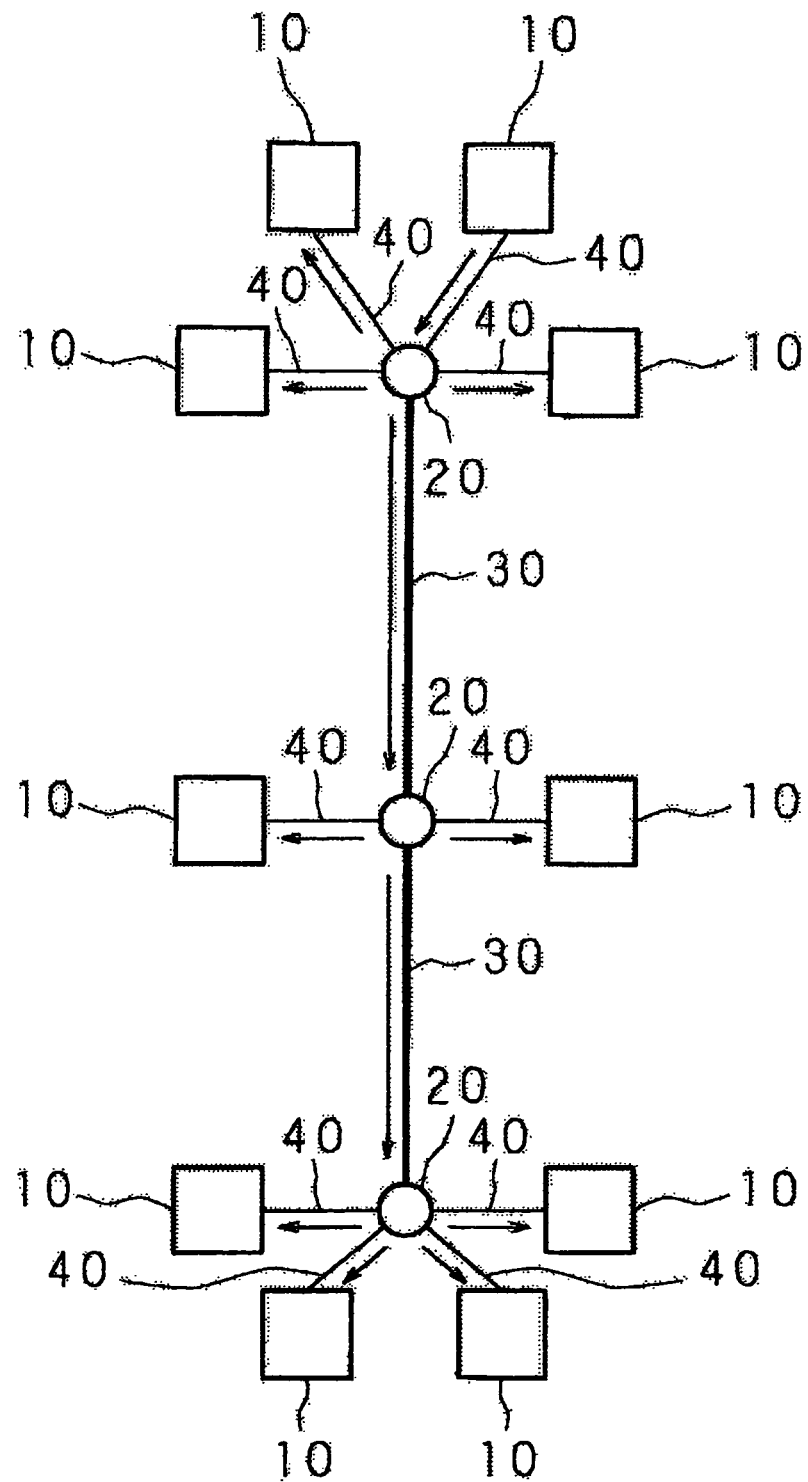
FIG. 2 is a schematic diagram showing an example of the vehicle network system.

FIG. 2 is a schematic diagram showing a communication example of the vehicle network system, and shows the transmissions and receptions of signals, as indicated by arrows, from the transmission side to the reception side of the vehicle network system of FIG. 1. Here, the descriptions are made on the vehicle 1, although omitted from the drawing, such that the upper portion of FIG. 2 is located at the front of the vehicle 1 whereas the lower portion is located at the back of the vehicle 1. In case one ECU 10 arranged in the front portion of the vehicle 1 transmits the optical signals, for example, these optical signals are received by the converter 20 arranged in the front portion of the vehicle 1. The converter 20 transmits the received optical signals to the remaining three ECUs 10 arranged in the front portion of the vehicle 1, and converts the received optical signals into electric signals and transmits the converted electric signals to the converter 20 in the central portion of the vehicle 1. The converter 20 at the central portion of the vehicle 1 converts the received electric signals into optical signals, to transmit the optical signals to the two ECUs 10 arranged at the central portion of the vehicle 1, and transmits the received electric signals to the converter 20 arranged in the rear portion of the vehicle 1. The converter 20 at the rear portion of the vehicle 1 converts the received electric signals into optical signals, and transmits the converted optical signals to the four ECUs 10 arranged in the rear portion of the vehicle 1.

Thus, the converter 20 transmits, in case it receives a signal from any of the plural communication lines of the metal cables 30 or the optical fibers 40 connected therewith, the received signal in a proper signal mode to all the remaining communication lines. As a result, the signal, as transmitted from one ECU 10, can be received by all the remaining ECUs 10 mounted on the vehicle 1, so that all the ECUs 10 mounted on the vehicle 1 are enabled to cooperate with each other by sharing the information.

In the vehicle network system thus constituted, the plural ECUs 10 of the vehicle 1 are connected in the star shape with the converters 20 through the optical fibers 40 so that the ringing phenomenon can be prevented at the time of communications. Moreover, the plural converters 20 are connected through the metal cable 30 so that the degree of freedom for arranging the communication lines between the converters 20 can be enhanced. Thus, the ECUs 10, as arranged within a range close to the front portion, the central portion and the rear portion of the vehicle 1, are connected with one converter 20, and the ECUs 10, as arranged at distant positions between the front portion and the central portion or between the central portion and the rear portion of the vehicle 1, are individually connected with the different converters 20 so that the communications are made through the communication lines between the converters 20. As a result, it is possible to constitute the vehicle network system easily and to enhance the reliability of the communications. In case the converter 20 receives signals through any of the communication lines connected, the received signal is transmitted to all the devices connected with other communication lines. As a result, all the ECUs 10, as mounted on the vehicle 1, can share the information easily so that the plural ECUs 10 can cooperate easily.

Here, this mode of embodiment is constituted such that the converter 20 receives signals from any of the communication lines but transmits the received signals to all the remaining communication lines. However, the constitution should not be limited thereto but may be modified such that the converter 20 selects one or more from its connected devices and transmits the received signals to only the selected device or devices. Moreover, the constitution of the vehicle network system shown in FIG. 1 presents only one example, but the invention should not be limited thereto. In FIG. 1, for example, the constitution is made such that the ten ECUs 10 are mounted on the vehicle 1, but the invention should not be limited thereto. The constitution may be made such that nine or less or eleven or more ECUs 10 are mounted. Likewise, the three converters 20 are mounted on the vehicle 1, but the invention should not be limited thereto. The constitution may be made such that two or less or four or more converters 20 are mounted. Moreover, the device, as connected with the network, is the ECU 10, but the invention should not be limited thereto. The constitution may be made such that another device is connected.

On the other hand, the arrangement, as shown in FIG. 1, of the ECUs 10 and the converters 20 in the vehicle 1 should not be limited to the shown on, but may be suited for the shape of the body of the vehicle 1. Moreover, the arrangements and the lengths of the metal cables 30 and the optical fibers 40 may also be made suitable for the shape of the body of the vehicle 1 and for the arrangements of the ECUs 10 and the converters 20. Moreover, the metal cables 30 and the optical fibers 40 could also be bundled and arranged when they are mounted on the vehicle 1. This arrangement does not go out of the gist of the invention.

(Modification)

Figure 3:
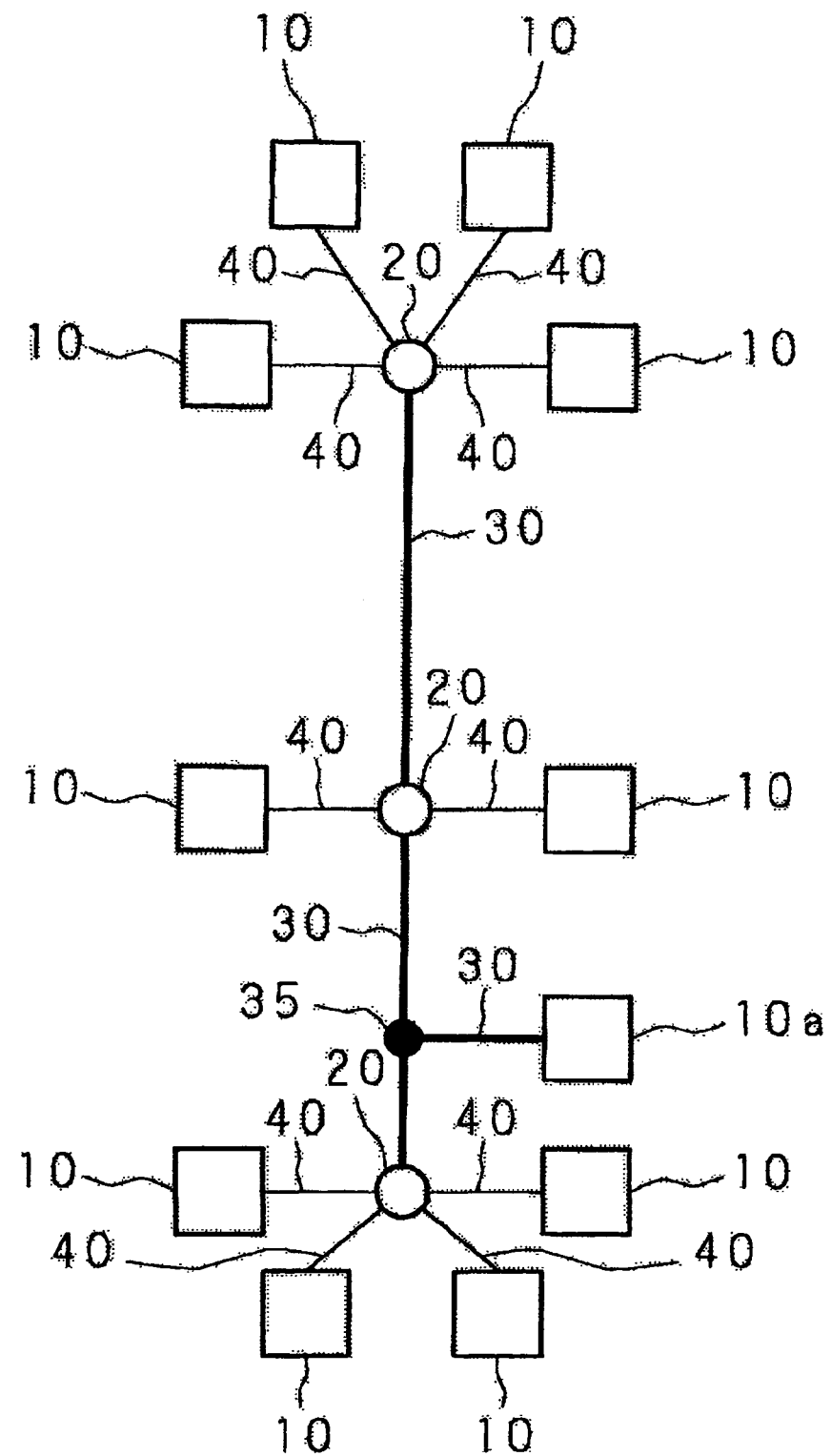
FIG. 3 is a schematic diagram showing of a vehicle network system according to a modification of the embodiment.
Figure 4A:
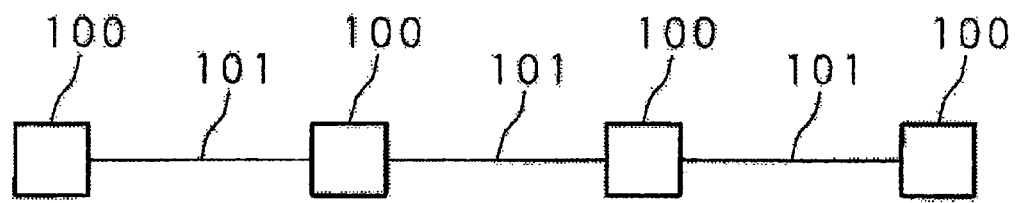
FIG. 4A is a schematic diagram showing a cascade type of a vehicle network system in the related art.
Figure 4B:
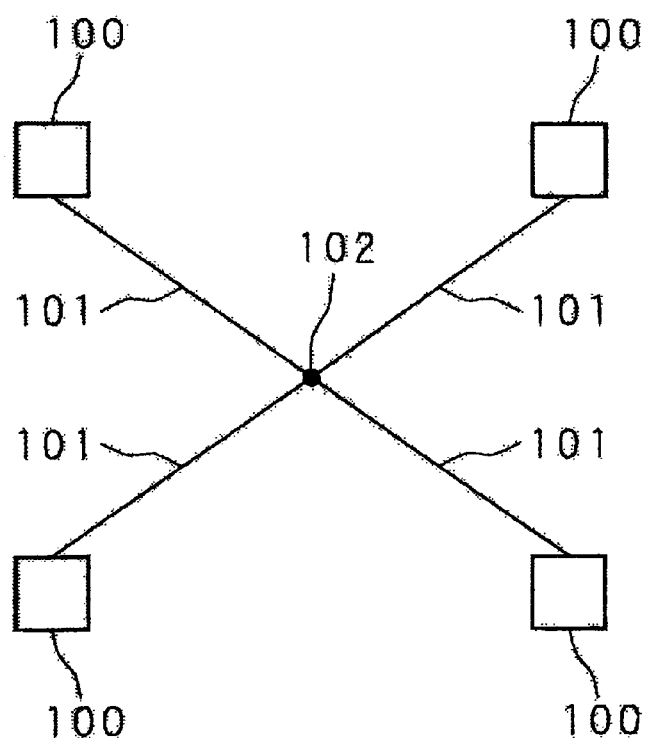
FIG. 4B is a schematic diagram showing a star type of a vehicle network system in the related art.

FIG. 3 is a schematic diagram showing a constitution of a vehicle network system according to a modification of the invention. Here, the vehicle 1 is not shown as in FIG. 2, but the descriptions are made on the vehicle 1 such that the upper portion of FIG. 3 is located at the front of the vehicle 1 whereas the lower portion is located at the back of the vehicle 1. In the vehicle network system according to the modification, the metal cable 30 between the converter 20 of the central portion of the vehicle 1 and the converter 20 of the rear portion is bifurcated at a branching point 35, and an ECU 10a is connected to one end of the metal cable 30 branched. For example, the electric signals, as transmitted from the converter 20 of the central portion, can be received through the metal cable 30 by the converter 20 of the rear portion and by the ECU 10a of the branching end of the metal cable 30. Moreover, the electric signals, as transmitted from the ECU 10a, can be received by the two converters 20 of the central portion and the rear portion of the vehicle 1.

In case the metal cable 30 is branched, the ringing phenomenon may occur at the time of communications. Therefore, it is desired that the length of the metal cable 30 from the branching point 35 of the metal cable 30 to the ECU 10a is equal to or less than the length L, as calculated by Formula 1, as follows.

[Formula 1]

$$L = \frac{T_0 \times V}{2}. \tag{1}$$

Here in Formula 1, Sign To designates the rising time of the electric signals at the time of communications through the metal cable 30, Sign V designates the velocity of the signal. In the case of the rising time of To=5 nano-seconds and the velocity of V=20 cm/nano-second, for example, the length L of the metal cable 30 is L=50 cm from Formula 1. Depending upon the design of the metal cable 30, however, the easiness for the ringing phenomenon to occur is different. Therefore, the length L of the metal cable 30 from the branching point 35 to the ECU 10a should not be necessarily limited to that specified by Formula 1, but may be as large as to cause no ringing phenomenon.

What is claimed is:

1. A vehicle network system comprising:
   a plurality of star networks, wherein a plurality of devices mounted on a vehicle are connected in a star shape through respective branch lines in each of the plurality of star networks;
   a trunk line for connecting the plurality of star networks; and
   a plurality of converters, each of the plurality of converters connected to respective star networks of the plurality of star networks configured for performing mutual conversions between optical signals and electric signals, wherein:
   the respective branch lines are communication lines configured for optical communications, and not electric communication, to prevent occurrence of a ringing phenomenon in each of the plurality of star networks,
   the trunk line is a communication line configured for electric communication and not optical communications,
   the plurality of devices are connected to the plurality of converters through the respective branch lines in the respective star networks of the plurality of star networks,
   each of the plurality of converters are connected to each other through the trunk line,
   each of the plurality of converters output the signals inputted from the trunk line to the respective branch lines, and
   each of the plurality of converters output the signals inputted from one of the branch lines to the trunk line and other branch lines in the respective star network.

2. The vehicle network system according to claim 1, wherein the respective branch lines comprise optical fibers.

3. The vehicle network system according to claim 1, wherein the trunk line comprises a metal cable.

4. A vehicle network system comprising:
   a plurality of star networks, each of the plurality of star networks having a respective converter of a plurality of convertors, wherein each of a plurality of devices mounted on a vehicle are connected through branch lines to one respective converter of the plurality of converters of one star network of the plurality of star networks; and
   a trunk line that connects each of the respective converters of the plurality of converters of the plurality of star networks, wherein
   the respective branch lines are communication lines configured for optical communications, and not electric communication, to prevent occurrence of a ringing phenomenon in each of the plurality of star networks,
   the trunk line is a communication line configured for electric communication, and not optical communications,
   a length of each branch line connecting each of the plurality of devices to the respective converter of the plurality of converters is shorter than a length of the trunk line between adjacent converters,
   each of the plurality of converters output the signals inputted from the trunk line to the respective branch lines, and
   each of the plurality of converters output the signals inputted from one of the branch lines to the trunk line and other branch lines in the respective star network.

* * * * *